US009209726B2

(12) United States Patent
Kaufmann et al.

(10) Patent No.: US 9,209,726 B2
(45) Date of Patent: Dec. 8, 2015

(54) METHOD FOR DETERMINING THE SPEED OF A SYNCHRONOUS MACHINE, CIRCUIT CONFIGURATION FOR ACTUATING A SYNCHRONOUS MACHINE, AND USE OF SUCH A CONFIGURATION

(75) Inventors: Tom Kaufmann, Ippenschied (DE); Thomas Pröger, Rödermark (DE); Jochen Leideck, Roβdorf (DE); Jan Statzner, Neu Isenburg (DE); Christian Bitsch, Heppenheim (DE); Peter Stauder, Mainz (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 194 days.

(21) Appl. No.: 13/990,589

(22) PCT Filed: Nov. 21, 2011

(86) PCT No.: PCT/EP2011/070548
§ 371 (c)(1),
(2), (4) Date: Jul. 9, 2013

(87) PCT Pub. No.: WO2012/072438
PCT Pub. Date: Jun. 7, 2012

(65) Prior Publication Data
US 2013/0300324 A1    Nov. 14, 2013

(30) Foreign Application Priority Data
Dec. 1, 2010 (DE) .......................... 10 2010 062 273

(51) Int. Cl.
*H02P 6/16* (2006.01)
(52) U.S. Cl.
CPC ...................................... *H02P 6/165* (2013.01)

(58) Field of Classification Search
USPC ............ 318/400.01, 700, 400.38, 400.4, 799, 318/809, 400.04, 721; 369/44.34
See application file for complete search history.

(56) References Cited

U.S. PATENT DOCUMENTS 6,081,087 A * 6/2000 Iijima et al. .............. 318/400.13
7,696,705 B2 * 4/2010 Stork .......................... 318/254.1

FOREIGN PATENT DOCUMENTS

DE    196 22 042 A1    12/1997
DE    103 35 862 A1    3/2005
(Continued)

OTHER PUBLICATIONS

PCT International Search Report—Nov. 21, 2011.
(Continued)

*Primary Examiner* — Rita Leykin
(74) *Attorney, Agent, or Firm* — Brinks Gilson & Lione (57) ABSTRACT

The invention relates to a method wherein the speed of the rotor of an electronically commutated synchronous machine is determined or controlled by means of one or more rotor position sensors, in particular, three rotor position sensors that are fixed to the stator, and a time measuring device, wherein the angle traveled by the rotor and the time lapsed during the travel are measured, wherein the measured angle traveled by the rotor is corrected by means of one or more first correction constants, in particular a differential for correcting for the influence of non-uniform positioning or expansion of the position marking of the rotor, and a circuit configuration for actuating an electronically commutated synchronous machine.

18 Claims, 4 Drawing Sheets

(56) References Cited

FOREIGN PATENT DOCUMENTS

| DE | 10 2005 019 515 A1 | 12/2005 |
| DE | 10 2008 005 054 A1 | 1/2009 |
| EP | 2 073 020 A1 | 6/2009 |
| FR | 2 897 944 | 8/2007 |
| WO | WO 03/054556 A1 | 7/2003 |

OTHER PUBLICATIONS

German Examination Report—Dec. 9, 2011.

* cited by examiner

METHOD FOR DETERMINING THE SPEED OF A SYNCHRONOUS MACHINE, CIRCUIT CONFIGURATION FOR ACTUATING A SYNCHRONOUS MACHINE, AND USE OF SUCH A CONFIGURATION

CROSS-REFERENCE TO RELATED APPLICATIONS

This application claims priority to German Patent Application No. 10 2010 062 273.7, filed Dec. 1, 2010 and PCT/EP2011/070548, filed Nov. 21, 2011.

FIELD OF THE INVENTION

The invention relates to a method in which the speed of the rotor of an electronically commutated synchronous machine is determined and/or controlled by means of one or more, and preferably three, rotor position sensors fixed to the stator and a timing device, wherein the angle traversed by the rotor and the time that has lapsed during the rotation are measured. The invention further relates to a circuit configuration implementing the above characterized method.

BACKGROUND

DE 10 2005 019 515 A1 describes a method for measuring the speed of an electronically commutated motor, which has a primary part with a winding and a secondary part with magnet segments which are offset with respect to one another in the circumferential direction and are magnetized alternately in mutually opposite directions, wherein the secondary part is rotated relative to the primary part. A plurality of magnetic field sensors detect the position of the magnet segments, wherein the time between two changes in the position measurement signal is measured. During the calculation of the motor speed, the influence of tolerances of the magnet segments in terms of their positioning and/or dimensions is compensated for, wherein in each case one correction factor is determined, stored and used for the correction of the speed signal, preferably for each of the magnet segment/sensor combinations.

The above-described method in accordance with the prior art has the disadvantage that errors caused by different switching thresholds of the different magnetic field sensors can only be corrected when in each case one correction factor is determined for each magnet segment/sensor combination for both directions of rotation of the motor. After deactivation of the motor, for example during a standstill of a vehicle having the motor, a complete set of correction factors needs to be determined again and adjusted with the stored values, which is very time-consuming owing to the multiplicity of correction factors required. A dependence of the correction factors on the speed of the motor can also occur, since said correction factors cannot simultaneously correctly describe the influence of angular errors and signal propagation times.

Therefore, it is the object of the present invention to provide a method for determining the motor speed which does not have the above mentioned disadvantages.

This object is achieved according to this invention.

INITIAL DESCRIPTION

The invention provides a method, in which the speed of the rotor of an electronically commutated synchronous machine is determined and/or controlled by means of one or more, preferably three, rotor position sensors fixed to the stator and a timing device, wherein the angle traversed by the rotor and the time that has lapsed during this are measured. The measured angle traversed by the rotor is corrected by one or more first correction constants, preferably by a difference being formed for correcting the influence of nonuniform positioning and/or expansion of position markers on the rotor. Position markers on the rotor are understood to mean encoder wheels which are magnetized differently in sectors, the magnetic field of the rotor, or visual marks. Depending on the type of position marker, a rotor position sensor can therefore comprise a magnetic field-dependent switch, a Hall sensor, a light barrier or similar apparatuses. The errors caused, for example, by nonuniform magnetization of the encoder wheel are markedly reduced in terms of the speed determined by means of the first correction constant.

Expediently, a plurality of rotor position sensors are provided and inaccuracies in the angles spanned between the rotor position sensors are corrected by means of one or more second correction constants, preferably by a difference being formed for correcting the influence of imprecise positioning of the rotor position sensors. Consequently, errors caused by imprecise positioning of the rotor position sensors can also be markedly reduced.

It is advantageous if the measured time is corrected, wherein preferably the influence of different propagation times of the signals of the rotor position sensors is compensated for by means of one or more third correction constants by forming a difference.

It is particularly advantageous if one or more third correction constants are determined as early as during the design and/or manufacture of the motor. It is particularly advantageous to store this/these third correction constant(s) in a nonvolatile memory. Then, a learning process for determining this/these constant(s) is not required, but instead this/these constants can be read at the beginning of a motor cycle. A motor cycle is in this case understood to mean the period of time between the application of a supply voltage to the actuation circuit and isolation of this circuit from the power supply.

Preferably, at least one correction constant, in particular the first correction constants, is/are selected depending on the direction of rotation of the motor. If the switching thresholds of the rotor position sensors cause a directionally dependent size of the encoder wheel sectors, this can be compensated for by first correction constants which are dependent on the direction of rotation.

Preferably, at least one of the correction constants is determined in a learning process, and in particular one or more correction constants are stored in a nonvolatile memory. A learning process is in this case understood to mean the calculation of the desired correction constant(s) from measurement data determined under suitable conditions, which can take place once or a plurality of times and can produce, via comparisons or statistical considerations, (in each case) a value for the desired constant(s) and possibly (in each case) an accuracy level. Once the learning process has been implemented, the correction constant(s) can be stored. In subsequent motor cycles, it is not necessary for the learning process to be implemented again in order to determine this/these constant(s), but instead this/these constant(s) can be read at the beginning of a motor cycle.

It is advantageous if one or more second correction constants are determined as early as during the manufacture of the motor, preferably by virtue of the positions of the rotor position sensors being determined precisely by an external measuring apparatus. It is particularly advantageous to store this/these second correction constant(s) in a nonvolatile memory. Then, a learning process for determining this/these constant(s) is not required, but instead this/these constant(s) can be read at the beginning of a motor cycle.

Particularly preferably, determination of the correction constants only takes place when uniform running of the rotor has been identified. Thus, the correction constants are not falsified by unsuitable measurement conditions during their determination.

Very particularly preferably, uniform running of the rotor is identified on the basis of the difference in the times of arrival of the rotor position signals corresponding to a defined minimum angle traversed by the rotor.

Expediently, one or more correction constants are determined from the differences in the times of arrival of different rotor position signals.

It is particularly expedient if one or more first correction constants are determined from the time differences corresponding to a third of a revolution. In particular the individual times of arrival of the rotor position signal edges corresponding to a third of a revolution and of two further rotor position signal edges are stored and evaluated.

It is very particularly expedient if one or more second correction constants is/are calculated from the time differences corresponding to a complete revolution, in particular in this case the individual times of arrival of the rotor position signal edges corresponding to a revolution and of two further rotor position signal edges are stored and evaluated.

It is particularly expedient if the actual spanned angle is calculated from the ratio of the time differences for a rotor rotation through the angle spanned by the two sensors under consideration to the time differences corresponding to a complete revolution.

Particularly preferably, the first correction constants are calculated from the ratio of the time difference corresponding to a rotation of the rotor through the sector under consideration to the time difference corresponding to a third or an integral multiple of a third of a revolution, wherein the ratio of the two time differences is converted into an angle in particular for each sector under consideration.

The invention also relates to a circuit configuration for actuating an electronically commutated synchronous machine, which implements a method in which the speed of an electronically commutated synchronous machine is determined with the aid of one or more, preferably three, rotor position sensors fixed to the stator and in particular is part of a circuit configuration for the open-loop or closed-loop control of the braking of a motor vehicle.

Preferably, the circuit configuration implements a method, as described herein.

In a further preferred embodiment of the invention, the circuit configuration has means for actuating the electronically commutated synchronous machine on the basis of field-oriented control, wherein interpolation of the rotor positions is performed, and the determined rotor position is corrected using one or more correction constants.

The invention furthermore relates to the use of such a circuit configuration in motor vehicles.

BRIEF DESCRIPTION OF THE DRAWINGS

Further preferred embodiments result from the dependent claims and the description below relating to an exemplary embodiment with reference to figures, in which:

ADDITIONAL DETAILED DESCRIPTION

Figure 1:
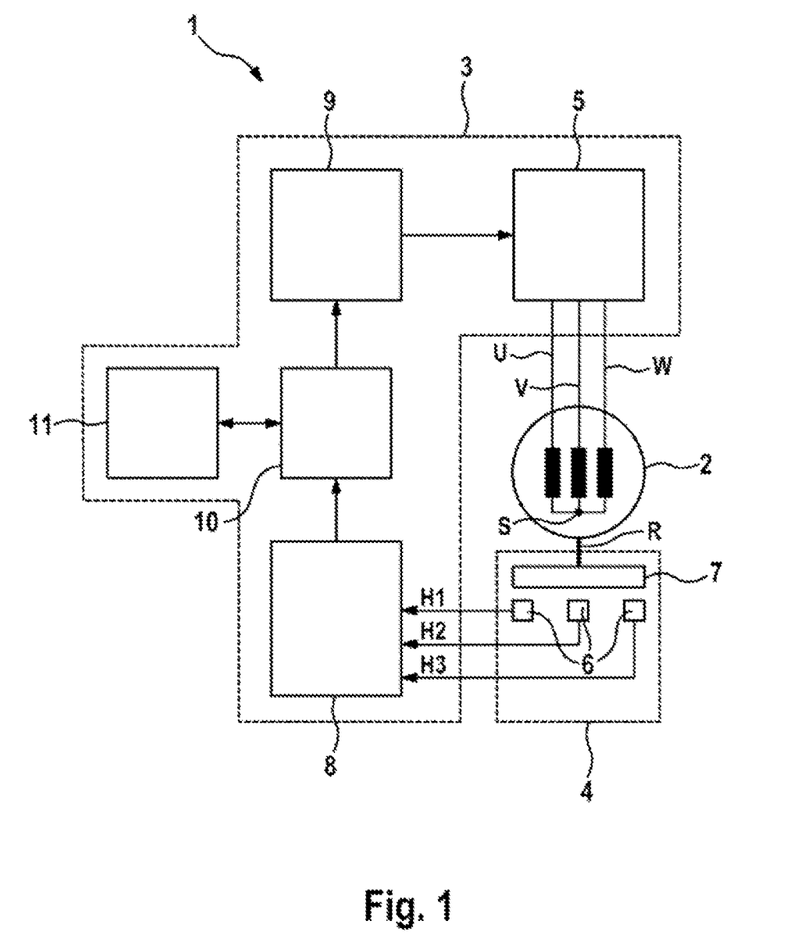
FIG. 1 shows a schematic overview of an electronically commutated synchronous machine which may be operated in accordance with the present invention, FIGS. 2a) and 2b) show an exemplary configuration of the Hall sensors and the encoder wheel and a scheme for speed determination.

The electronically commutated synchronous machine (motor) 1 illustrated in FIG. 1 comprises an electromechanical energy converter 2, an electronic control device 3, and a rotor position encoder system 4. In addition to the use as a drive, a use of the synchronous machine 1 as a generator is also possible, wherein mechanical motion is consequently converted into electrical energy. The stator typically comprises three phase windings, which are in this case illustrated as black rectangles. In each case one connection of the phase windings U, V, W is connected electrically to a neutral point S (a "Y" three phase configuration). In principle, a delta connection of the phase windings would also be possible. The permanent magnet rotor (not illustrated, but which is coupled with phase windings U, V, and W) is connected to a magnetic encoder wheel 7 via a rotor shaft R mounted on bearings. The magnetic field of the encoder wheel is sampled by digital Hall sensors 6, which are also referred to as Hall switches. In principle, the leakage field of the rotor magnets can also be sampled; such a design may be provided in the case of low-power electronically commutated synchronous machines makes it possible to dispense with the encoder wheel. These Hall switches switch on, for example, when they are located in the field of a magnetic north pole and do not conduct any current when a magnetic south pole is directly adjacent. Hall switches generally have hysteresis, for which reason switchover only takes place when the magnetic field exceeds a determined switchover threshold. From each of the typically three Hall sensors H1, H2, H3, a signal line leads to a circuit 8, which determines the rotor position and the times of the position changes from the data from the Hall sensors. The speed and/or at least one correction value is/are determined by the speed determination circuit 10 from rotor position sensor data and time information. Newly determined correction values are stored in the nonvolatile memory 11 and can be read later. Using the electrical angle which has been determined as rotor position and possibly the speed, the actuation circuit 9 determines the voltage vector to be applied to the feedlines of the phase windings U, V, W and actuates the semiconductor switches of the inverter bridge 5 correspondingly. The electronic control device can also be implemented wholly or partially as a program implemented by a microcontroller.

Figure 2A:
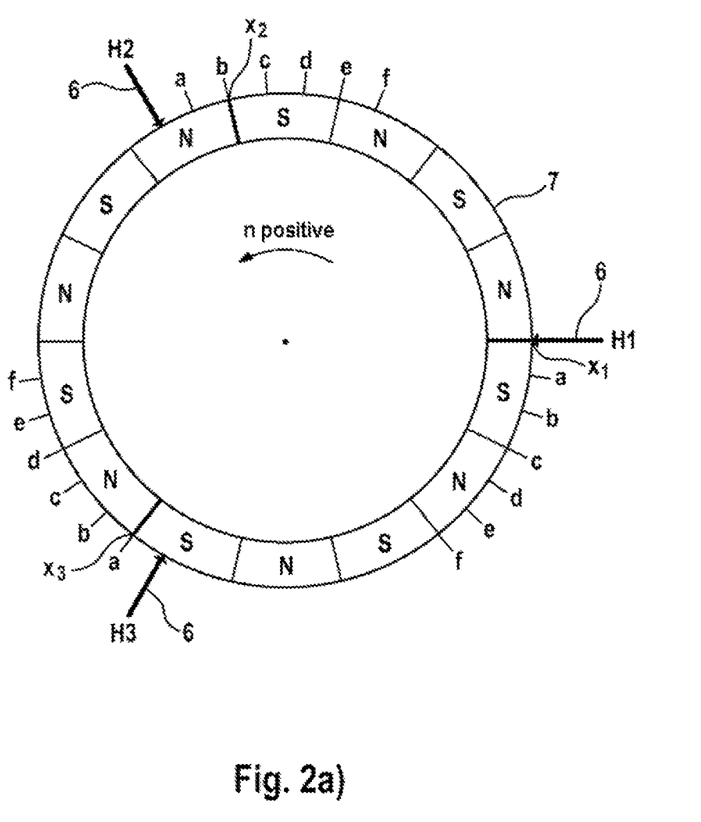

The geometry of the encoder wheel 7 and the Hall sensors H1-H3 is shown in FIG. 2a), in which the axis of rotation protrudes out of the plane of the paper. The three sensors H1-H3 fixed to the stator are fitted in such a way that, in the event of a rotor rotation in intervals of electrical angles of in each case 60°, in each case one sensor changes its initial state. The relationship between the electrical and mechanical angles can be determined in accordance with the following formula:

$$\phi_{el} = \phi_{mech} \cdot \rho$$

Here, $\phi_{el}$ denotes the electrical angle, $\phi_{mech}$ denotes the mechanical angle and $\rho$ denotes the pole pair number. For a suitably mounted bar magnet as a rotor, therefore, the electrical and magnetic angles would be the same; in the case shown where $\rho=7$, the mechanical angles are much smaller than the electrical angles.

Expedient configurations of the three Hall sensors result in the case of differences in the electrical angles $\Delta\phi_{sensor\_el}$ between the sensors of $$\Delta\phi_{sensor\_el}=120°+n\cdot 360°$$

where n is an integer; this indicates how often the commutation scheme used needs to be run in order to move the rotor from the position of the first sensor (H1 for example) under consideration to the next sensor (H2 for example).

If the rotor rotates in the counter clockwise direction and the sensors are positioned as illustrated, the illustrated relative positions from a to f are traversed; the Hall sensors output the signals indicated in the table (N: north pole in front of sensor; S: south pole in front of sensor):

| Position | a | b | c | d | e | f |
|----------|---|---|---|---|---|---|
| H1 | S | S | S | N | N | N |
| H3 | S | N | N | N | S | S |
| H2 | N | N | S | S | S | N |

In this case, the position f corresponds to the initial position, i.e. the sensor signals and the commutation scheme are repeated after an electrical angle of 360°, which corresponds to the mechanical angle of a pole pair. As a result of the three Hall sensors, absolute electrical angles of precisely 60° are obtained.

Figure 2B:
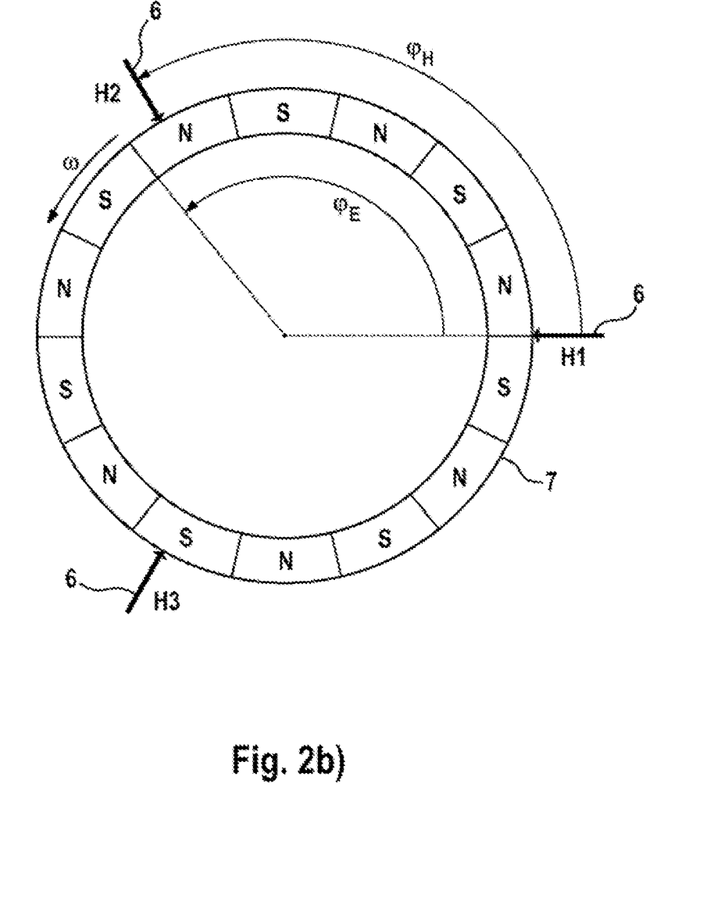

In order to determine the speed of the motor, the time between two successive sensor edges, i.e. the switchover points of two adjacent Hall sensors, can be measured and the traversed sector angle of the encoder wheel related to this time. It is disadvantageous here that all of the tolerances in the sensor positioning, encoder wheel manufacture, and signal processing have an effect on the speed determined. This is explained in more detail with reference to the scheme shown in FIG. 2b for speed determination in the exemplary geometry. If the rotor rotates in the direction illustrated, first a rotor position signal edge is generated when the sensor H1 switches over from N to S. Once the angle $\phi_E$ has been traversed, the sensor H2 switches over from S to N, as a result of which a second rotor position signal edge is produced. By measuring the time difference t between the occurrence of the two signal edges, the angle of velocity ω can be calculated with knowledge of the angle $\phi_H$ spanned between the two rotor position sensors:

$$\omega = \frac{\varphi_E - \varphi_H}{t}$$

In this case, both angles traversed by the rotor and angles spanned by the sensors are both expediently measured as mechanical angles.

The angle of velocity determined in accordance with this method or the speed contains an error owing to unavoidable tolerances, with the accuracy being limited by the following influences, specifically:
1. Owing to imprecise positioning of the two Hall sensors, the angle actually spanned between said Hall sensors does not correspond to the expected value.
2. The encoder wheel is not magnetized entirely uniformly. Imprecise boundaries between the sectors result in the measured angle deviating from the angle actually traversed by the rotor.
3. Different switching thresholds of the different Hall sensors (H1, H2, H3) during switchover from N to S in comparison with switchover from S to N cause errors in the apparent position of the encoder wheel and in the apparent angle traversed.
4. The electrical circuit configuration can result in the switch-on and switch-off delay of the Hall switches differing.

In principle, the accuracy can be increased by suitable filtering of the measurement signal, but this influences the phase of the speed signal negatively and causes a time delay. A signal filtered in this way is therefore only usable to a restricted extent for speed regulation with a high bandwidth.

Therefore, in the method according to the invention, suitable correction constants are determined for the various influences. The difference between the switch-on and switch-off delay is substantially dependent on the type of Hall sensors used and the design of the electrical circuit configuration and is therefore virtually identical for all electronically commutated synchronous machines of one design. Therefore, as with all other influences which cause a constant time delay, this can be taken into consideration with a design-dependent correction constant $t_c$, which is preferably stored in a nonvolatile memory of the actuation circuit.

Accordingly, the angular errors $\phi_{Ec}$ caused by imprecise magnetization of the encoder wheel (dependent on the sector under consideration) and angular errors $\phi_{Hc}$ caused by deviations in the positioning of the Hall sensors (dependent on the two Hall sensors under consideration) are different from motor to motor and are taken into consideration by motor-individual correction constants.

For precise determination of the angular velocity, therefore, the mentioned errors are corrected:

$$\omega = \frac{(\varphi_E - \varphi_{Ec}) - (\varphi_H - \varphi_{Hc})}{t - t_c}$$

If a uniform rotary movement through a certain angle is possible, such as expediently at least one revolution, the correction constants required can be determined in a learning process by the actuation circuit of the motor.

If, instead of a magnetized encoder wheel and Hall sensors, a sectorially perforated disk and fork light barriers are used, the influence of nonuniform sector markings and further errors in the apparatus can be corrected by means of the same method.

Figure 3:
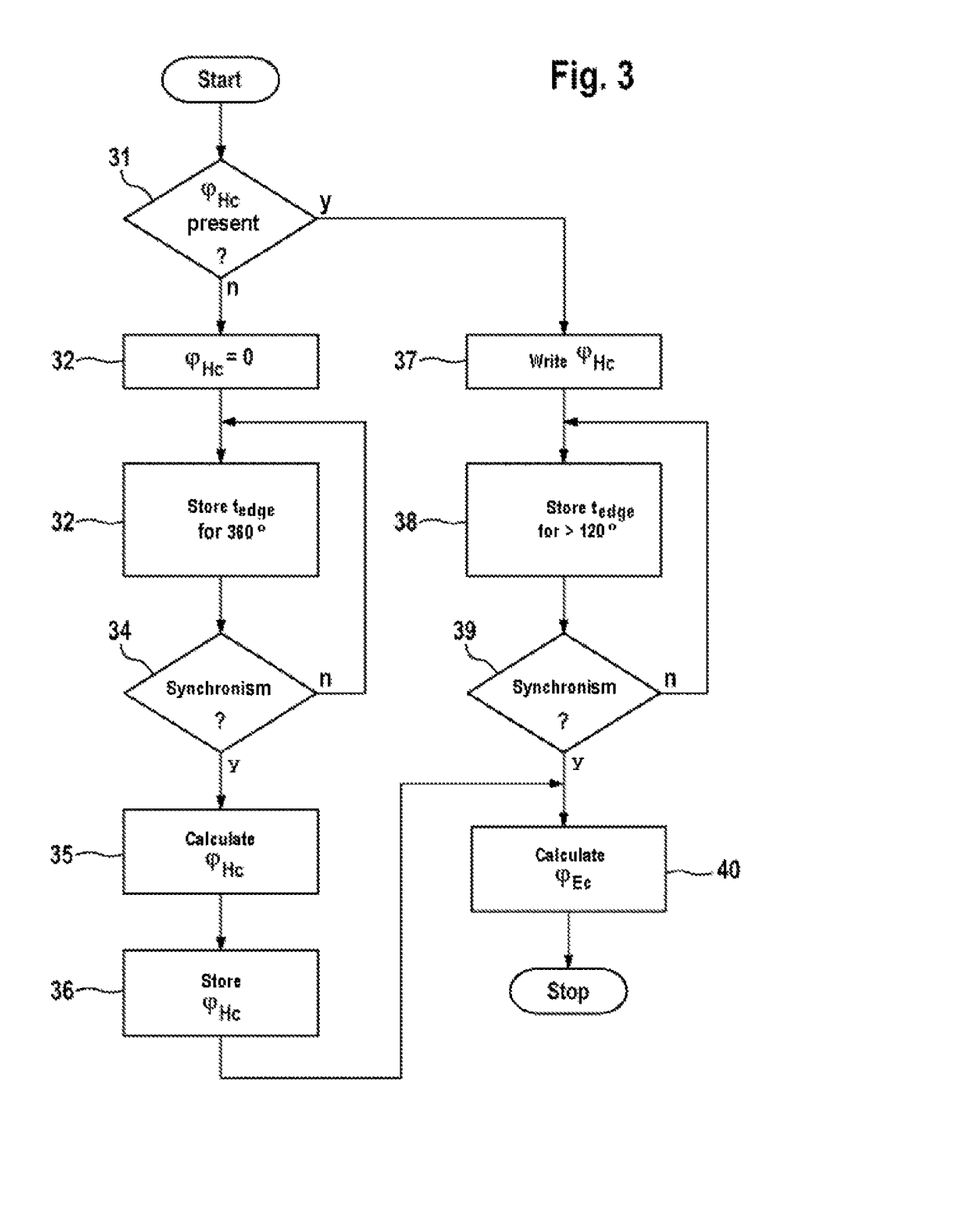
FIG. 3 shows a flow chart of the learning process in accordance with an embodiment of the present invention.

FIG. 3 shows a schematic illustration of the sequence for an exemplary learning process according to the invention. In addition to the sequences described below, when implementing the method according to the invention, other sequences of the individual steps and computation operations can also be used. First, a check is performed in step 31 to ascertain whether, in an earlier motor cycle, correction values $\phi_{Hc}$ are already provided for erroneous positioning of the Hall sensors. If this is not the case, the correction constants $\phi_{Hc}$ are preferably set to zero in step 32. Speed measurements which may be performed at the same time as the learning process are thus not falsified by erroneous correction values. At least one of the following steps in the learning process can therefore also be performed by independent program parts running in the background. Only the detection and buffer-storing of the times $t_i$ of the occurrence of Hall sensor signal edges for 360°, i.e. over a revolution, which detection and buffer-storing takes place in step 33, needs to take place with high priority since no edges should remain undetected. In this case, the values are stored continuously and edge times entered first are removed again from the memory first as soon as new edge times are stored. In addition to the times, the sensor which has switched over is also detected and a traversed sector number allocated. While the Hall sensors can be assigned uniquely, no identification of the encoder wheel sectors which last beyond a motor cycle is possible. The synchronism of the motor is checked in step 34 which now follows. First, the time periods $T_i$ between the occurrence of two signal edges are calculated:

$$T_i = t_{i+1} - t_i$$

Then, the time periods corresponding to a revolution are added to give a first rotation duration:

$$T_{Rotation,1} = \sum_{i=1}^{2p*3} T_i$$

Taking into consideration the signal edge arriving directly thereafter, a second rotation duration is determined:

$$T_{Rotation,2} = \sum_{i=2}^{2p*3+1} T_i$$

This calculation of the rotation duration is performed for all signal edges of a motor revolution:

$$T_{Rotation,j} = \sum_{i=j}^{2p*3+j-1} T_i$$

j=1 ... 2p*3

If the calculated rotation durations correspond in the context of the desired accuracy $\epsilon$ over a complete motor revolution a $(|\max\{T_{rotation,i}\} - \min\{T_{rotation,k}\}| < \epsilon)$, uniform running of the motor for a motor revolution is present; the correction constants can be calculated. Otherwise, signal edges are written and buffer-stored again until the synchronism condition is met. Checking for synchronism therefore requires two revolutions, wherein preferably the times for a revolution are buffer-stored in circulating fashion. In principle, checking for synchronism can also be performed using other methods than the circular buffer described here.

In order to obtain correction values for erroneous positioning of the Hall sensors, the time periods of the signal edges belonging to in each case 120° or ⅓ of a revolution are added:

$$T_{H12} = \sum_{i=1}^{2p} T_i; \quad T_{H23} = \sum_{i=2p+1}^{2 \cdot 2p} T_i; \quad T_{H31} = \sum_{i=2 \cdot 2p+1}^{3 \cdot 2p} T_i.$$

With reference to FIG. 2a), the first time $T_{H12}$ characterizing the angle actually spanned between sensors H1 and H2 corresponds to a traversal of the position encoder point x1 in front of H1 up to the position encoder point x1 in front of H2, the time $T_{H23}$ characterizing the circle segment between the sensors H2 and H3 corresponds to the traversal of the position encoder point x1 in front of H2 up to the position encoder point x1 in front of H3, while the time $T_{H31}$ characterizing the sector between the sensors H3 and H1 corresponds to the traversal of the position encoder point x1 in front of H3 up to the position encoder point x1 in front of H1. When considering a complete rotation, each magnetization change $x_i$ of the encoder ring scans each angle $\phi_H$ spanned between the sensors precisely once. If a relatively large number of time periods $T_i$ is buffer-stored, the accuracy of the calculated time periods can be increased by averaging.

Ignoring errors caused by different switching thresholds of the Hall sensors, it is sufficient if at least 2p+2 successive time periods $T_i$ are stored:

$$T_{H12} = \sum_{i=1}^{2p} T_i; \quad T_{H31} = \sum_{i=2}^{2p+1} T_i; \quad T_{H23} = \sum_{i=3}^{2p+2} T_i$$

In this case, the first time $T_{H12}$ corresponds to a traversal of the position encoder point x1 in front of H1 up to the position encoder point x1 in front of H2, the time $T_{H23}$ corresponds to the traversal of the position encoder point x2 in front of H2 up to the position encoder point x2 in front of H3, while $T_{H31}$ corresponds to the traversal of the position encoder point x3 in front of H3 up to the position encoder point x3 in front of H1.

If the times determined are related to the time for a complete rotation of the rotor, the correction constants $\phi_{Hc12}$, $\phi_{Hc23}$ and $\phi_{Hc31}$ can be calculated:

$$\varphi_{Hc12} = 360° \frac{T_{H12}}{T_{rotation}} - \varphi_{H12}$$

$$\varphi_{Hc23} = 360° \frac{T_{H23}}{T_{rotation}} - \varphi_{H23}$$

$$\varphi_{Hc31} = 360° \frac{T_{H31}}{T_{rotation}} - \varphi_{H31}$$

The correction constants therefore give the difference between the actually spanned angle and the desired angle $\phi_H$ between the two Hall sensors under consideration. The geometry shown in FIG. 2 has a uniform distribution of the Hall sensors:

$$\phi_{H12} = \phi_{H23} = \phi_{H31} = \phi_H = 120°$$

Given a nonuniform distribution of the Hall sensors, the procedure needs to be adapted corresponding to the angular differences now valid.

In step 36, the calculated correction constants are stored; furthermore, suitably averaged time periods are determined which can be used in the calculation of the correction values for imprecise magnetization of the encoder wheel, which calculation is performed in step 40.

If the check in step 31 shows the presence of correction values $\phi_{Hc}$ for imprecise positioning of the Hall sensors, these correction values are written in step 37 and are then available for future calculations.

When the positions of the Hall sensors are known, it is sufficient to check the synchronism over an angle spanned between two Hall sensors of preferably 120° or ⅓ of a revolution, for which purpose the rotor therefore needs to rotate through ⅔ revolutions and two further signal edges. In this case, in step 38, the times of the occurrence of the signal edges for 120° and two further signal edges are stored continuously.

A changed number of Hall sensors can be taken into consideration by adapting the rotation angle provided for storage. In the case of nonuniformly distributed sensors, the signal edges of a selected sensor pair over a complete revolution may need to be taken into consideration.

In order to check the synchronism, first the time periods $T_i$ between two successive signal edges are calculated:

$$T_i = t_{i+1} - t_i$$

Then, the time periods corresponding to ⅓ of a revolution are added to give a first duration:

$$T_{Third,1} = \sum_{i=1}^{2p} T_i$$

Taking into consideration the signal edge arriving thereafter, which signal edge is produced by the same Hall switch, a second duration is determined:

$$T_{Third,2} = \sum_{i=4}^{2p+3} T_i$$

This calculation of the durations is performed for all signal edges of a Hall switch:

$$T_{Third,j} = \sum_{i=3j+1}^{2p+3j} T_i$$

If the calculated values for the durations correspond for ⅓ of a revolution in the context of the desired accuracy $\epsilon$ ($|\max\{T_{Third,i}\} - \min\{T_{Third,k}\}| < \epsilon$), it is assumed that uniform running of the motor is present; the correction constants can be calculated. Otherwise, signal edges are written and buffer-stored again until the synchronism condition is met. The criterion can be tightened further by the corresponding durations also being formed in the case of edges of the other Hall switches in the same way and in each case being checked for consistency.

Now, in step 40, the calculation of the correction constants for nonuniform magnetization of the encoder wheel can be performed.

First the angle of velocity w is calculated using either the averaged durations from step 38 or the averaged time periods from step 36:

$$\omega = \frac{360°}{T_{rotation}} = \frac{120°}{T_{Third}}$$

Then, the calculation of the correction values of the sector under consideration is performed:

$$\phi_{Ec} = \phi_E - \omega \cdot (t - t_c) - \phi_H + \phi_{Hc}$$

The correction constant $\phi_{Hc}$ is selected in accordance with the Hall sensors switching at the start and end of the sector rotation. The calculation of $\phi_{Ec}$ is performed successively for all sectors of the encoder wheel.

Storage of the correction values beyond a motor cycle is possible when the rotor is secured against rotation when the machine is switched off. If the electric motor is used in conjunction with a suitable transmission as a drive for a friction brake for a motor vehicle, this can be ensured by the actuation of a parking brake. Then, correction values which have been determined once are preferably buffer-stored and used in subsequent motor cycles without another learning process needing to be implemented. If the motor is not prevented from rotating, the correction constants for nonuniform magnetization of the encoder wheel need to be learned in each case again at the beginning of a motor cycle.

In accordance with an alternative preferred embodiment of the invention, existing correction values which have already been learned earlier are used in a memory in order to further improve the newly determined correction values. Expediently, the stored correction values are exchanged cyclically until the sum of the squares of the deviations between newly learned and stored constants reaches a minimum value. It is particularly advantageous if, once assignment has been performed, newly learned and stored correction values are averaged, wherein the stored constants are in particular weighted to a greater extent the more learned correction values have been used in the calculation thereof.

In a further preferred embodiment of the invention, the desired accuracy $\epsilon$ is adapted as soon as a number of correction values has already been learned. A renewed learning process is only implemented when the motor clearly has fewer fluctuations in synchronism.

If a determination of correction values is performed repeatedly, it is particularly expedient if the weighting of the correction constants is performed using existing synchronism fluctuations and the number of measurement data used for the calculation of said correction constants.

In a further preferred embodiment of the invention, the correction constants $\phi_{Ec}$ are determined separately for both the directions of rotation of the motor, wherein expediently first the synchronism is checked for one direction of rotation of the motor and the correction constants are calculated and, in the event of a change in the direction of rotation, likewise synchronism is checked and the correction constants calculated. It is particularly expedient if, on each change in the direction of rotation, the correction constants are recalculated and the weighted or unweighted mean value of already stored and newly determined correction constants is formed.

In accordance with a further preferred embodiment of the invention, the actuation of the motor is performed using interpolation of the rotor position, which is based on the data from one or more rotor position sensors. This makes it possible to replace the block commutation described in connection with FIGS. 2*a*) and 2*b*), in which discrete basic voltage vectors are applied, with field-oriented open-loop or closed-loop control of the motor in accordance with known methods, in particular space vector modulation (see, for example, Dierk Schröder, Elektrische Antriebe—Regelung von Antriebssystemen, Springer, Berlin, Heidelberg, 2009). The constants determined with the aid of the learning process according to the invention for correcting Hall sensor position errors make it possible to reach the optimum commutation angle comparatively precisely, as a result of which the synchronism of the motor is improved.

The above description constitutes the preferred embodiment of the present invention, it will be appreciated that the present invention is susceptible to modification, variation and change without departing from the proper scope and fair meaning of the accompanying claims.

The invention claimed is:

1. A method for determining or controlling a speed of a rotor of an electronically commutated synchronous machine having a plurality of position sensors fixed to a stator of the machine and a timing device, the method comprising the steps of:
   measuring the angle traversed by rotation of the rotor and the time that has lapsed during the rotation,
   correcting the measured angle traversed by the rotor by a first correction constant for correcting the influence of nonuniform positioning or expansion of position markers on the rotor which interact with the rotor position sensors, and
   correcting the angles spanned between the rotor position sensors by a second correction constant for correcting the influence of imprecise positioning of the rotor position sensors.

2. The method as claimed in claim 1, further comprising in that the measured time that has elapsed is corrected, wherein the influence of different propagation times of signals of the rotor position sensors is compensated for by means of a third correction constant.

3. The method as claimed in claim 2 further comprising in that at least one of the correction constants is selected depending on the direction of rotation of the motor.

4. The method as claimed in claim 2 further comprising in that at least one of the correction constants is determined in a learning process, and at least one of the correction constants is stored in a nonvolatile memory.

5. The method as claimed in claim 2, further comprising in that determination of at least one of the correction constants only takes place when uniform running of the rotor has been identified.

6. The method as claimed in claim 5, further comprising in that uniform running of the rotor is identified on the basis of the difference in the times of arrival of the rotor position signals corresponding to a defined minimum angle traversed by the rotor during the rotation.

7. The method as claimed in claim 2 further comprising in that one or more of the correction constants is determined from the differences in the times of arrival of different rotor position signals.

8. The method as claimed in claim 7 further comprising in that the second correction constant is calculated from the time differences corresponding to a complete revolution of the rotor, and the individual times of arrival of the rotor position signal edges corresponding to the complete revolution and of two further rotor position signal edges are stored and evaluated.

9. The method as claimed in claim 2 further comprising correcting by means of a plurality of the third correction constant.

10. The method as claimed in claim 1 further comprising in that the first correction constant is calculated from the ratio of the time difference corresponding to a rotation of the rotor through a sector under consideration to the time difference corresponding to a third or an integral multiple of a third of a revolution of the rotor, wherein the ratio of the two time differences is converted into an angle for each sector under consideration.

11. The method as claimed in claim 1 wherein three of the rotor position sensors are provided.

12. The method as claimed in claim 1 further comprising correcting by means of a plurality of the first correction constant.

13. The method as claimed claim 1 further comprising correcting by means of a plurality of the second correction constant.

14. A method for determining or controlling a speed of a rotor of an electronically commutated synchronous machine having a plurality of position sensors fixed to a stator of the machine and a timing device, the method comprising the steps of:
- measuring the angle traversed by rotation of the rotor and the time that has lapsed during the rotation,
- correcting the measured angle traversed by the rotor by a first correction constant for correcting the influence of nonuniform positioning or expansion of position markers on the rotor which interact with the rotor position sensors,
correcting the angles spanned between the rotor position sensors by a second correction constant for correcting the influence of imprecise positioning of the rotor position sensors, and
- in that three of the rotor position sensors are provided and the first correction constant is determined from the time differences corresponding to a third of a revolution of the rotor, and the individual times of arrival of the rotor position signal edges corresponding to the third of a revolution and of two further rotor position signal edges are stored and evaluated.

15. The method as claimed in claim 14 further comprising in that the actual spanned angle of the rotor is calculated from the ratio of the time differences for a rotor rotation through the angle spanned by the two further sensors under consideration to the time differences corresponding to a complete revolution of the rotor.

16. A circuit configuration for actuating an electronically commutated synchronous machine, the circuit configuration comprising:
- a plurality of rotor position sensors fixed to a stator of the machine and a timing device;
- means for implementing a method, the means being part of a circuit configuration for the open-loop or closed-loop regulation of the braking of a motor vehicle,
- the means for implementing being configured to measure the angle traversed by rotation of the rotor and the time that has lapsed during the rotation, and correct the measured angle traversed by the rotor by a first correction constant for correcting the influence of nonuniform positioning or expansion of position markers on the rotor which interact with the rotor position sensors, and
- wherein the plurality of the rotor position sensors are provided and inaccuracies in the angles spanned between the rotor position sensors are corrected by means of a second correction constant for correcting the influence of imprecise positioning of the rotor position sensors.

17. The use of a circuit configuration as claimed in claim 16 in a motor vehicle.

18. A circuit configuration for actuating an electronically commutated synchronous machine, the circuit configuration comprising:
- a plurality of rotor position sensors fixed to a stator of the machine and a timing device;
- means for implementing a method, the means being part of a circuit configuration for the open-loop or closed-loop regulation of the braking of a motor vehicle,
- the means for implementing being configured to measure the angle traversed by rotation of the rotor and the time that has lapsed during the rotation, and correct the measured angle traversed by the rotor by a first correction constant for correcting the influence of nonuniform positioning or expansion of position markers on the rotor which interact with the rotor position sensors,
- wherein the plurality of the rotor position sensors are provided and inaccuracies in the angles spanned between the rotor position sensors are corrected by means of a second correction constant for correcting the influence of imprecise positioning of the rotor position sensors, and
- in that the circuit configuration has means for actuating the electronically commutated synchronous machine on the basis of field-oriented control, wherein interpolation of the rotor positions is performed, and the determined rotor position is corrected using one or more of the correction constants.

* * * * *